United States Patent
Topol et al.

(10) Patent No.: US 9,624,834 B2
(45) Date of Patent: Apr. 18, 2017

(54) LOW NOISE COMPRESSOR ROTOR FOR GEARED TURBOFAN ENGINE

(71) Applicant: UNITED TECHNOLOGIES CORPORATION, Hartford, CT (US)

(72) Inventors: David A. Topol, West Hartford, CT (US); Bruce L. Morin, Springfield, MA (US)

(73) Assignee: United Technologies Corporation, Farmington, CT (US)

(*) Notice: Subject to any disclaimer, the term of this patent is extended or adjusted under 35 U.S.C. 154(b) by 288 days.

(21) Appl. No.: 14/591,975

(22) Filed: Jan. 8, 2015

(65) Prior Publication Data

US 2015/0152787 A1    Jun. 4, 2015

Related U.S. Application Data

(63) Continuation-in-part of application No. 14/144,710, filed on Dec. 31, 2013, now abandoned, which is a
(Continued)

(51) Int. Cl.
  *F02C 7/24*    (2006.01)
  *F02C 7/36*    (2006.01)
  (Continued)

(52) U.S. Cl.
  CPC .................. *F02C 7/36* (2013.01); *F01D 5/02* (2013.01); *F01D 5/12* (2013.01); *F05D 2220/36* (2013.01);
  (Continued)

(58) Field of Classification Search
  CPC ..... F01D 5/02; F01D 5/12; F02C 7/36; F05D 2260/40311; F05D 2220/36;
  (Continued)

(56) References Cited

U.S. PATENT DOCUMENTS 2,850,226 A    9/1958 Lundquist
2,957,655 A    10/1960 Knapp et al.
(Continued)

FOREIGN PATENT DOCUMENTS

CN    1453466 A    11/2003
CN    1952373 A    4/2007
(Continued)

OTHER PUBLICATIONS

Decision Denying Institution of Inter Partes Review. *General Electric Company*, Petitioner, v. *United Technologies Corporation*, Patent Owner. Entered Sep. 29, 2016. (IPR 2016-00857).

(Continued)

*Primary Examiner* — Igor Kershteyn
(74) *Attorney, Agent, or Firm* — Carlson, Gaskey & Olds, PC

(57) ABSTRACT

A gas turbine engine has a fan and a turbine having a fan drive turbine rotor. The fan drive turbine rotor drives a compressor rotor. A gear reduction effects a reduction in the speed of the fan relative to an input speed from the fan drive turbine rotor that drives the compressor rotor. The compressor rotor has a number of compressor blades in at least one of a plurality of rows of the compressor rotor. The blades operate at least some of the time at a rotational speed. The number of compressor blades in at least one row and the rotational speed are such that the following formula holds true for at least one row of the compressor rotor turbine:

(number of blades×rotational speed)/60 s≥5500 Hz, and the rotational speed is in revolutions per minute. A method of designing a gas turbine engine and a compressor module are also disclosed.

27 Claims, 1 Drawing Sheet

Related U.S. Application Data continuation of application No. 14/016,436, filed on Sep. 3, 2013, now Pat. No. 8,714,913, which is a continuation of application No. 13/630,276, filed on Sep. 28, 2012, now Pat. No. 8,632,301.

(51) Int. Cl.
  *F01D 5/02* (2006.01)
  *F01D 5/12* (2006.01)

(52) U.S. Cl.
  CPC  *F05D 2260/40311* (2013.01); *F05D 2260/96* (2013.01); *Y02T 50/673* (2013.01); *Y10T 29/4932* (2015.01); *Y10T 29/49236* (2015.01)

(58) Field of Classification Search
  CPC .............. F05D 2260/96; Y02T 50/673; Y10T 29/49236; Y10T 29/4932
  See application file for complete search history.

(56) References Cited

U.S. PATENT DOCUMENTS

| | | |
|---|---|---|
| 3,194,487 A | 7/1965 | Tyler et al. |
| 3,270,953 A | 9/1966 | Jan Jerie et al. |
| 3,287,906 A | 11/1966 | McCormick |
| 3,373,928 A | 3/1968 | Erwin et al. |
| 3,618,699 A | 11/1971 | Evans et al. |
| 3,747,343 A | 7/1973 | Rosen |
| 3,754,484 A | 8/1973 | Roberts |
| 3,892,358 A | 7/1975 | Gisslen |
| 3,953,148 A | 4/1976 | Seippel et al. |
| 3,973,865 A | 8/1976 | Mugele |
| 4,130,872 A | 12/1978 | Harloff |
| 4,131,387 A | 12/1978 | Kazin et al. |
| 4,732,532 A | 3/1988 | Schwaller et al. |
| 4,883,240 A | 11/1989 | Adamson et al. |
| 4,968,216 A | 11/1990 | Anderson et al. |
| 5,169,288 A | 12/1992 | Gliebe et al. |
| 5,190,441 A | 3/1993 | Murphy et al. |
| 5,197,855 A | 3/1993 | Magliozzi et al. |
| 5,433,674 A | 7/1995 | Sheridan et al. |
| 5,447,411 A | 9/1995 | Curley et al. |
| 5,486,091 A | 1/1996 | Sharma |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,036,438 A | 3/2000 | Imai |
| 6,195,983 B1 | 3/2001 | Wadia et al. |
| 6,223,616 B1 | 5/2001 | Sheridan |
| 6,260,794 B1 | 7/2001 | Rowe |
| 6,318,070 B1 | 11/2001 | Rey et al. |
| 6,554,564 B1 | 4/2003 | Lord |
| 6,684,626 B1 * | 2/2004 | Orlando .................... F01D 5/03 415/65 |
| 6,732,502 B2 | 5/2004 | Seda et al. |
| 6,763,652 B2 * | 7/2004 | Baughman .............. F02C 3/067 415/199.5 |
| 6,763,653 B2 * | 7/2004 | Orlando .................. F02C 3/067 60/226.1 |
| 6,814,541 B2 | 11/2004 | Evans et al. |
| 7,021,042 B2 | 4/2006 | Law |
| 7,108,485 B2 | 9/2006 | Wobben |
| 7,185,484 B2 * | 3/2007 | Griffin, III ................ F01D 1/24 415/68 |
| 7,526,913 B2 | 5/2009 | Orlando et al. |
| 7,591,754 B2 | 9/2009 | Duong et al. |
| 7,694,505 B2 | 4/2010 | Schilling |
| 7,806,651 B2 | 10/2010 | Kennepohl et al. |
| 7,824,305 B2 | 11/2010 | Duong et al. |
| 7,926,260 B2 | 4/2011 | Sheridan et al. |
| 7,976,283 B2 | 7/2011 | Huck |
| 7,984,607 B2 | 7/2011 | Sharma et al. |
| 8,205,432 B2 | 6/2012 | Sheridan |
| 8,246,292 B1 | 8/2012 | Morin et al. |
| 8,834,099 B1 | 9/2014 | Topol et al. |
| 2002/0096598 A1 | 7/2002 | Nelson |
| 2003/0163983 A1 | 9/2003 | Seda et al. |
| 2004/0128978 A1 | 7/2004 | McCune et al. |
| 2005/0017876 A1 | 1/2005 | Ziarno |
| 2006/0117756 A1 | 6/2006 | Wakeman et al. |
| 2008/0022691 A1 | 1/2008 | Kennepohl et al. |
| 2008/0098716 A1 | 5/2008 | Orlando et al. |
| 2008/0190095 A1 | 8/2008 | Baran |
| 2008/0317588 A1 | 12/2008 | Grabowski et al. |
| 2009/0191047 A1 | 7/2009 | Schlinker et al. |
| 2009/0260345 A1 | 10/2009 | Chaudhry |
| 2009/0301055 A1 | 12/2009 | Kallappa |
| 2010/0148396 A1 | 6/2010 | Xie et al. |
| 2010/0192595 A1 | 8/2010 | Orlando et al. |
| 2010/0331139 A1 | 12/2010 | McCune |
| 2011/0056208 A1 | 3/2011 | Norris et al. |
| 2011/0159797 A1 | 6/2011 | Beltman et al. |
| 2011/0219741 A1 | 9/2011 | Ernst et al. |
| 2013/0186058 A1 | 7/2013 | Sheridan et al. |
| 2013/0195610 A1 | 8/2013 | Rose et al. |
| 2013/0276424 A1 | 10/2013 | Topol et al. |
| 2014/0003915 A1 | 1/2014 | Topol et al. |

FOREIGN PATENT DOCUMENTS

| | | |
|---|---|---|
| DE | 102010023703 A1 | 12/2011 |
| EP | 2157305 A2 | 2/2010 |
| FR | 2260701 A1 | 9/1975 |
| GB | 1386481 A | 3/1975 |
| GB | 1516041 | 6/1978 |
| GB | 2041090 | 9/1980 |
| JP | 2003286857 A | 10/2003 |
| JP | 2004526619 A | 9/2004 |
| JP | 2006161809 A | 6/2006 |
| JP | 2007113579 A | 5/2007 |
| JP | 2008115856 A | 5/2008 |
| JP | 2008115858 A | 5/2008 |
| JP | 2008196489 A | 8/2008 |
| JP | 2009002329 A | 1/2009 |
| JP | 2010209916 A | 9/2010 |
| WO | 0019082 A2 | 4/2000 |
| WO | 2007038674 | 4/2007 |
| WO | 2013122713 A2 | 8/2013 |

OTHER PUBLICATIONS

Reshotko, Meyer et al. "Core noise measurements on a YF-102 turbofan engine," NASA Technical Memorandum X-73587, Jan. 24, 1977.
IPR—Declaration of Dr. Magdy Attia, Apr. 5, 2016.
Dr. Günter Wilfert, MTU Aero Engines, Geared Fan, Lecture Series Mar. 2008, Aero-Engine Design: From State of the Art Turbofans Towards Innovative Architectures (2008).
J. Kurzke, Fundamental Differences Between Conventional and Geared Turbofans, Proceedings of ASME Turbo Expo 2009 (2009) (excerpts).
Turbofan and Turbojet Engines, Database Handbook, Roux, 2007.
Michael Norton and Denis Karczub, Fundamentals of Noise and Vibration Analysis for Engineers (2003) (excerpts).
Gerald L. Brines, Pratt & Whitney, The Turbofan of Tomorrow, 112 Mechanical Engineering 8 (1990).
Elements of Gas Turbine Propulsion, Jack D. Mattingly, 1996.
Richard Whitaker, ALF502: plugging the turbofan gap, Flight International (1982).
Petition for Inter Parties Review of U.S. Pat. No. 8,246,292, Apr. 8, 2016.
Jane's Aero-Engines, Issue Seven, Copyright 2000, pp. 510-512, Mar. 2000.
International Preliminary Report on Patentability for International Application No. PCT/US2013/022035 mailed on Aug. 14, 2014.
J. S. Sabnis, 2005, Emissions and Noise—Next Frontier for Aircraft Engine Technologies, presented at the AIAA/AAAF Aircraft Noise and Emissions Reduction Symposium, Monterey, California, USA.

(56) References Cited

OTHER PUBLICATIONS

Third Party Observations, filed with EPO Dec. 3, 2015.
D. Crichton, et al., "Design and operation for ultra low noise take-off," American Institute of Aeronautics and Astronautics, Jan. 8-11, 2007.
F. J. Malzacher, et al., "Aerodesign and Testing of an Aeromechanically Highly Loaded LP Turbine," Journal of Turbomachinery, Oct. 2006, vol. 128, pp. 643-649.
Wilfert, et al., "CLEAN—Validation of a High Efficient Low NOx core, a GTF High Speed Turbine and an Integration of a Recuperator in an Environmental Friendly Engine Concept," American Institute of Aeronautics and Astronautics, Jul. 10-13, 2005, pp. 1-11.
Wilfert, et al., "CLEAN—Validation of a GTF High Speed Turbine and Integration of Heat Exchanger Technology in an Environmentally Friendly Concept," Inernational Society on Air Breathing Engines, Feb. 2005.
Kurzke, Joachim, "Performance Modeling Methodology: Efficiency Definitions for Cooled Single and Multistage Turbines," American Society of Mechanical Engineers, Jun. 2-6, 2002, pp. 1-8.
Halliwell, Ian, "Preliminary Engine Design—A Practical Overview," American Institute of Aeronautics and Astronautics , Jul. 13-15, 1998, pp. 1-7.
J.M. Stricker, "The Gas Turbine Engine Conceptual Design Process—An Integrated Approach," RTO, May 11-15, 1998.
J. M. Stricker, et al., "Computerized Preliminary Design of Turbomachinery," American Society of Mechanical Engineers, Jun. 3-6, 1991, pp. 1-7.
Glassman, Arthur J., "Users Manual for Updated Computer Code for Axial-Flow Compressor Conceptual Design," NASA, Jul. 1992.
R.A. Wall, "Axial Flow Compressor Performance Prediction," Rolls-Royce, 1971.
M.G. Philpot, "Practical Considerations in Designing the Engine Cycle," Defence Research Agency, 1992.
Stewart, Warner L., "A Study of Axial-Flow Turbine Efficiency Characteristics in Terms of Velocity Diagram Parameters," American Society of Mechanical Engineers, 1962.
Glassman, Arthur J., "Turbine Design and Application," NASA, vol. One, 1972.
S. F. Smith, "A Simple Correlation of Turbine Efficiency," Journal of the Royal Aeronautical Society, vol. 69, Jul. 1965.
J. Kurzke, "Calculation of Installation Effects Within Performance Computer Programs," Advisory Group for Aerospace Research and Development, May 1992.
P. Jeschke, et al., "Preliminary Gas Turbine Design Using the Multidisciplinary Design System MOPEDS," American Society of Mechanical Engineers, Apr. 2004, vol. 126, pp. 258-264.
EP Office Action for EP Application No. 13769027.7 mailed Jan. 9, 2015.
EP Office Action for EP Application No. 13769027.7 mailed Jun. 19, 2015.
EP Office Action for EP Application No. 13749721.0 mailed Sep. 11, 2015.
Third Party Opposition to Counterpart EP Application No. 13769027.7 received Apr. 2, 2015.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.

Gears Put a New Spin on Turbofan Performance, http://machinedesign.com/archive/gears-put-new-spin-turbofan-performance, Nov. 5, 1998.
C Riegler et al.: "The Geared Turbofan Technology—Opportunities, Challenges and Readiness Status", Proceedings CEAS 2007, Sep. 11, 2007.
Denós R. et al.: "Geared Fan", Mar. 3, 2008, Aero-Engine Design: From State-Of-The-Art Turbofans Towards Innovative Architectures—Hardcover. Lectures Series.
Third Party Observations, filed with European Patent Office Mar. 9, 2015.
Denós R. et al.: "Geared Fan", Mar. 3, 2008, Aero-Engine Design: From State-Of-The-Art Turbofans Towards Innovative Architectures—Hardcover. Lectures Series, Geared Fan, Dr. Gunter Wilfert, MTU Aero Engines.
Sasada, Eishiro, Kokuki Engine No Soon Teigen Gijutsu Saizensen, Aviation Environment Research, Japan, Airport Environment Improvement Foundation, Aviation Environment Research Center, Mar. 31, 2010, No. 14, 8-14.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.

(56) References Cited

OTHER PUBLICATIONS

Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
European Search Report for European Application No. 13749721.0 mailed Aug. 17, 2015.
European Search Report for European Application No. 15151747.1 mailed Jul. 9, 2015.
Petition for Inter Partes Review of U.S. Pat. No. 8,517,668. *General Electric Company*, Petitioner, v. *United Technologies Corporation*, Patent Owner. Filed Dec. 14, 2016.
Declaration of Dr. Magdy Attia. In re U.S. Pat. No. 8,517,668. Executed Dec. 8, 2016. pp. 1-81.
U.S. Department of Transportation: Federal Aviation Administration Advisory Circular. Runway overrun prevention. Dated: Nov. 6, 2007. p. 1-8 and Appendices.
U.S. Department of Transportation: Federal Aviation Administration Advisory Circular. Standard operating procedures for flight deck crewmembers. Dated: Feb. 27, 2013.. p. 1-6 and Appendices.
Cramoisi, G. Ed. (2012). Death in the Potomac: The crash of Air Florida Flight 90. Air Crash Investigations. Accident Report NTSB/AAR-82-8. p. 45-47.
Daly, M. Ed. (2010). Jane's Aero-Engine. Issue Twenty-seven. Mar. 2010. p. 633-636.
Clark, Bruce J. et al., "Measured and Predicted Noise of the AVCO-Lycoming YF-102 Turbofan Noise," NASA Technical Memorandum 79069, Mar. 14, 1979, pp. 1-18, Cleveland, Ohio.

\* cited by examiner

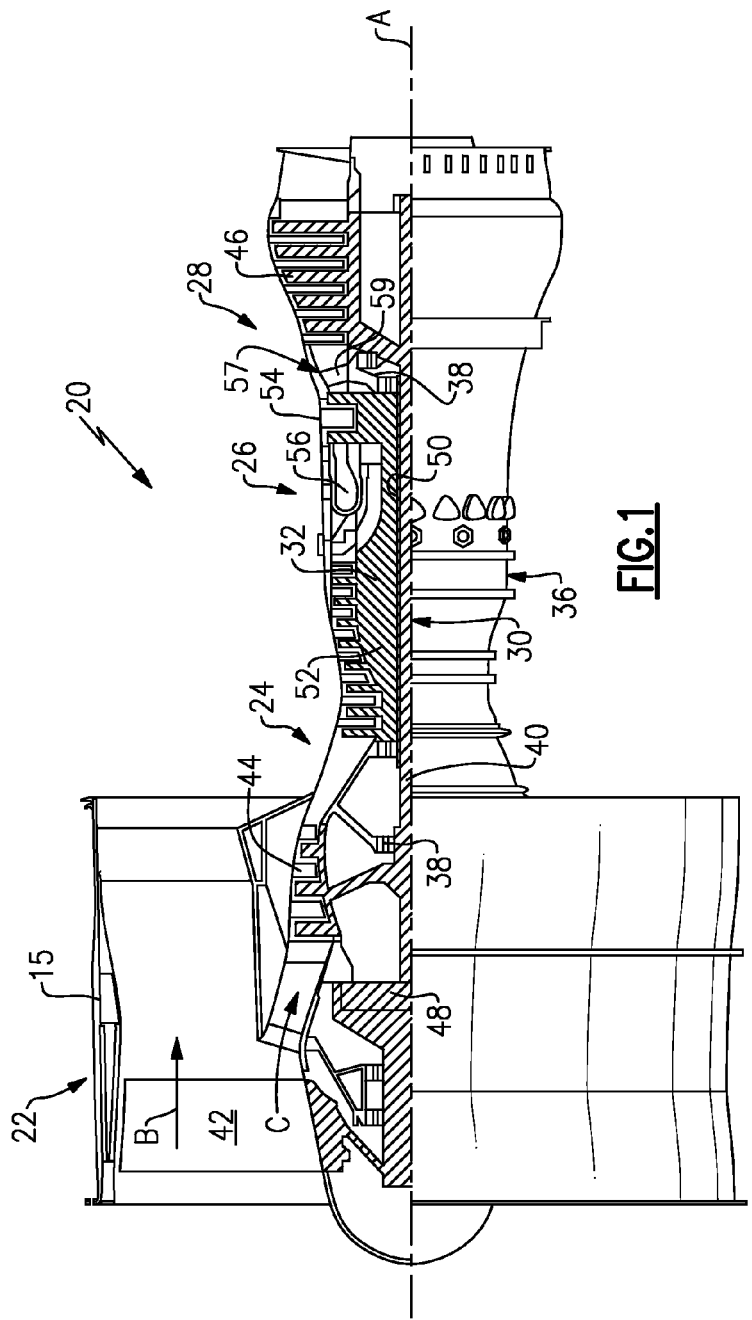
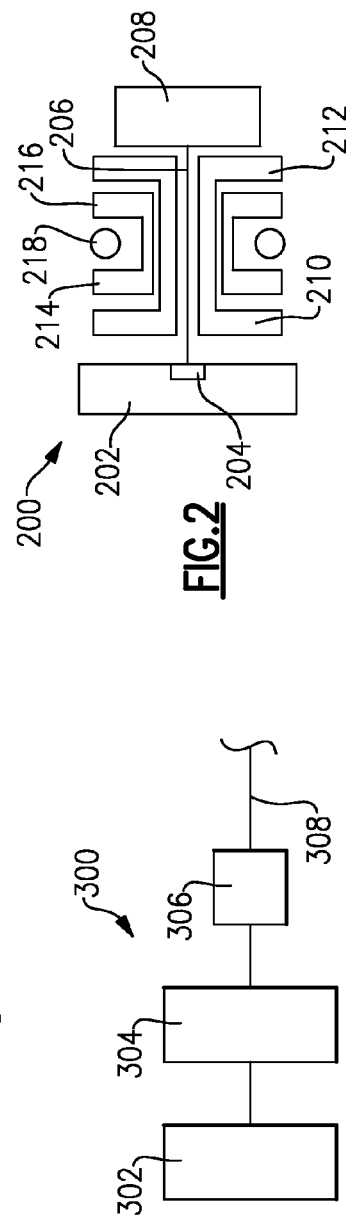

LOW NOISE COMPRESSOR ROTOR FOR GEARED TURBOFAN ENGINE

CROSS-REFERENCE TO RELATED APPLICATION

This application is a continuation-in-part of U.S. patent application Ser. No. 14/144,710, filed Dec. 31, 2013, which is a continuation of U.S. patent application Ser. No. 14/016,436, filed Sep. 3, 2013, now U.S. Pat. No. 8,714,913, issued May 6, 2014, which is a continuation of U.S. patent application Ser. No. 13/630,276, filed Sep. 28, 2012, now U.S. Pat. No. 8,632,301, issued Jan. 21, 2014.

BACKGROUND

This application relates to the design of a gas turbine engine rotor which can be operated to produce noise that is less sensitive to human hearing.

Gas turbine engines are known, and typically include a fan delivering air into a compressor. The air is compressed in the compressor and delivered downstream into a combustor section where it was mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades which rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades which rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

SUMMARY OF THE INVENTION

In a featured embodiment, a gas turbine engine comprises a fan and a turbine section having a fan drive turbine rotor, and a compressor rotor. A gear reduction effects a reduction in the speed of the fan relative to an input speed from the fan drive turbine rotor. The compressor rotor has a number of compressor blades in at least one of a plurality of rows of the compressor rotor. The blades operate at least some of the time at a rotational speed. The number of compressor blades in the at least one row and the rotational speed is such that the following formula holds true for the at least one row of the compressor rotor:

(the number of blades×the rotational speed)/60
s≥5500 Hz; and the rotational speed being in revolutions per minute.

In another embodiment according to the previous embodiment, the formula results in a number greater than or equal to about 6000 Hz.

In another embodiment according to any of the previous embodiments, the gas turbine engine is rated to produce about 15,000 pounds of thrust or more.

In another embodiment according to any of the previous embodiments, the formula holds true for the majority of the blade rows of the compressor rotor.

In another embodiment according to any of the previous embodiments, the gas turbine engine is rated to produce about 15,000 pounds of thrust or more.

In another embodiment according to any of the previous embodiments, the gear reduction has a gear ratio of greater than about 2.3.

In another embodiment according to any of the previous embodiments, the gear reduction has a gear ratio of greater than about 2.5.

In another embodiment according to any of the previous embodiments, the fan delivers air into a bypass duct, and a portion of air into the compressor rotor. A bypass ratio is defined as the volume of air delivered into the bypass duct compared to the volume of air delivered into the compressor rotor, and the bypass ratio being greater than about 6.

In another embodiment according to any of the previous embodiments, the bypass ratio is greater than about 10.

In another embodiment according to any of the previous embodiments, the formula results in a number greater than or equal to about 6000 Hz.

In another embodiment according to any of the previous embodiments, the rotational speed being an approach speed.

In another embodiment according to any of the previous embodiments, the turbine section includes a higher pressure turbine rotor and a lower pressure turbine rotor. The fan drive turbine rotor is the lower pressure turbine rotor.

In another embodiment according to any of the previous embodiments, the compressor rotor is a lower pressure compressor rotor, and the higher pressure turbine rotor drives a higher pressure compressor rotor.

In another embodiment according to any of the previous embodiments, there are three turbine rotors. The fan drive rotor turbine drives the fan. A second and third turbine rotor each drive respective compressor rotors of the compressor section.

In another embodiment according to any of the previous embodiments, the gear reduction is positioned intermediate the fan and a compressor rotor driven by the fan drive turbine rotor.

In another embodiment according to any of the previous embodiments, the gear reduction is positioned intermediate the fan drive turbine rotor and a compressor rotor driven by the fan drive turbine rotor.

In another featured embodiment, a method of designing a gas turbine engine comprises the steps of including a first turbine rotor to drive a compressor rotor and a fan turbine rotor for driving a fan through a gear reduction. A number of blades is selected in at least one row of the compressor rotor, in combination with a rotational speed of the compressor rotor, such that the following formula holds true for the at least one row of the compressor rotor:

(the number of blades×the rotational speed)/60 ≥5500 Hz; and the rotational speed being in revolutions per minute.

In another embodiment according to the previous embodiment, the formula results in a number greater than or equal to about 6000 Hz.

In another embodiment according to any of the previous embodiments, the gas turbine engine is rated to produce about 15,000 pounds of thrust or more.

In another embodiment according to any of the previous embodiments, the rotational speed is an approach speed.

In another embodiment according to any of the previous embodiments, the turbine section includes a higher pressure turbine rotor and a lower pressure turbine rotor. The fan drive turbine rotor is the lower pressure turbine rotor.

In another embodiment according to any of the previous embodiments, the compressor rotor is a lower pressure compressor rotor, and the higher pressure turbine rotor drives a higher pressure compressor rotor.

In another embodiment according to any of the previous embodiments, the first turbine rotor and the fan turbine rotor are provided by a single rotor.

These and other features of this application will be best understood from the following specification and drawings, the following of which is a brief description.

BRIEF DESCRIPTION OF THE DRAWINGS

FIG. 1 shows a gas turbine engine.
FIG. 2 shows another embodiment.
FIG. 3 shows yet another embodiment.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), or an intermediate spool, among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The terms "low" and "high" as applied to speed or pressure for the spools, compressors and turbines are of course relative to each other. That is, the low speed spool operates at a lower speed than the high speed spool, and the low pressure sections operate at lower pressure than the high pressures sections.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ °\ R)/(518.7°\ R]^{0.5}$. The "Low corrected fan tip speed" as disclosed herein according to one non-limiting embodiment is less than about 1150 ft/second.

The use of the gear reduction between the low speed spool and the fan allows an increase of speed to the low pressure compressor. In the past, the speed of the low pressure turbine and compressor has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the low pressure turbine and compressor speeds caused by a desire to not have unduly high fan speeds.

It has been discovered that a careful design between the number of rotating blades, and the rotational speed of the low pressure turbine can be selected to result in noise frequencies that are less sensitive to human hearing. The same is true for the low pressure compressor 44.

A formula has been developed as follows:

$$(\text{blade count} \times \text{rotational speed})/60 \text{ s} \geq 5500 \text{ Hz}.$$

That is, the number of rotating blades in any low pressure turbine stage, multiplied by the rotational speed of the low pressure turbine 46 (in revolutions per minute), divided by 60 s should be greater than or equal to 5500 Hz. The same holds true for the low pressure compressor stages. More narrowly, the amounts should be above 6000 Hz. A worker of ordinary skill in the art would recognize that the 60 s factor is to change revolutions per minute to Hertz, or revolutions per one second.

The operational speed of the low pressure turbine 46 and low pressure compressor 44 as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

It is envisioned that all of the rows in the low pressure turbine 46 meet the above formula. However, this application may also extend to low pressure turbines wherein the majority of the blade rows in the low pressure turbine meet the above formula, but perhaps some may not. The same is true for low pressure compressors, wherein all of the rows in the low pressure compressor 44 would meet the above formula. However, the application may extend to low pressure compressors wherein only the majority of the blade rows in the low pressure compressor meet the above formula, but some perhaps may not.

This will result in operational noise that would be less sensitive to human hearing.

In embodiments, it may be that the formula can result in a range of greater than or equal to 5500 Hz, and moving higher. Thus, by carefully designing the number of blades and controlling the operational speed of the low pressure turbine 46 (and a worker of ordinary skill in the art would recognize how to control this speed) one can assure that the noise frequencies produced by the low pressure turbine are of less concern to humans.

The same holds true for designing the number of blades and controlling the speed of the low pressure compressor 44. Again, a worker of ordinary skill in the art would recognize how to control the speed.

In embodiments, it may be only the low pressure turbine rotor 46, or the low pressure compressor rotor 44 which is designed to meet the meet the above formula. On the other hand, it is also possible to ensure that both the low pressure turbine 46 and low pressure compressor 44 meet the above formula.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 Hz number, and even approached 6000 Hz, however, this has not been in combination with the geared architecture, nor in the higher powered engines which have the larger fans, and thus the greater limitations on low pressure turbine or low pressure compressor speed.

FIG. 2 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 3 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIGS. 2 and 3 engines may be utilized with the speed and blade features disclosed above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan and a turbine section having a fan drive turbine rotor, and a compressor rotor;
    a gear reduction effecting a reduction in the speed of said fan relative to an input speed from said fan drive turbine rotor;
    said compressor rotor having a number of compressor blades in at least one of a plurality of rows of said compressor rotor, and said blades operating at least some of the time at a rotational speed, and said number of compressor blades in said at least one row and said rotational speed being such that the following formula holds true for said at least one row of the compressor rotor:

$$(\text{said number of blades} \times \text{said rotational speed})/60 \text{ sec} \geq 5500 \text{ Hz};$$

said rotational speed being an approach speed in revolutions per minute; and
    wherein a pressure ratio across the fan drive turbine rotor being greater than about 5.

2. The gas turbine engine as set forth in claim 1, wherein the formula results in a number greater than or equal to about 6000 Hz.

3. The gas turbine engine as set forth in claim 2, wherein said gas turbine engine is rated to produce about 15,000 pounds of thrust or more.

4. The gas turbine engine as set forth in claim 1, wherein said gas turbine engine is rated to produce about 15,000 pounds of thrust or more.

5. The gas turbine engine as set forth in claim 1, wherein said gear reduction has a gear ratio of greater than about 2.3.

6. The gas turbine engine as set forth in claim 5, wherein said gear reduction has a gear ratio of greater than about 2.5.

7. The gas turbine engine as set forth in claim 1, wherein said fan delivers air into a bypass duct, and a portion of air into said compressor rotor, with a bypass ratio defined as the volume of air delivered into the bypass duct compared to the volume of air delivered into the compressor rotor, and said bypass ratio being greater than about 6.

8. The gas turbine engine as set forth in claim 7, wherein said bypass ratio is greater than about 10.

9. The gas turbine engine as set forth in claim 8, wherein the formula results in a number greater than or equal to about 6000 Hz.

10. The gas turbine engine as set forth in claim 1, wherein said turbine section including a higher pressure turbine rotor and a lower pressure turbine rotor, and said fan drive turbine rotor being said lower pressure turbine rotor.

11. The gas turbine engine as set forth in claim 10, wherein said compressor rotor is a lower pressure compressor rotor, and said higher pressure turbine rotor driving a higher pressure compressor rotor.

12. The gas turbine engine as set forth in claim 1, wherein there are three turbine rotors, the fan drive rotor turbine driving the fan, and a second and third turbine rotor each driving respective compressor rotors of the compressor section.

13. The gas turbine engine as set forth in claim 1, wherein the gear reduction is positioned intermediate the fan and a compressor rotor driven by the fan drive turbine rotor.

14. The gas turbine engine as set forth in claim 1, wherein the gear reduction is positioned intermediate the fan drive turbine rotor and a compressor rotor driven by the fan drive turbine rotor.

15. A method of designing a gas turbine engine comprising the steps of:
including a first turbine rotor to drive a compressor rotor and a fan turbine rotor for driving a fan through a gear reduction, and selecting a number of blades in at least one row of the compressor rotor, in combination with a rotational speed of the compressor rotor, such that the following formula holds true for said at least one row of the compressor rotor:

(said number of blades×said rotational speed)/60 sec≥5500 Hz;

said rotational speed being an approach speed in revolutions per minute; and
wherein a pressure ratio across the fan turbine being greater than about 5.

16. The method as set forth in claim 15, wherein the formula results in a number greater than or equal to about 6000 Hz.

17. The method as set forth in claim 15, wherein said gas turbine engine is rated to produce about 15,000 pounds of thrust or more.

18. The method as set forth in claim 15, wherein the turbine section including a higher pressure turbine rotor and a lower pressure turbine rotor, and said fan drive turbine rotor being said lower pressure turbine rotor.

19. The method as set forth in claim 18, wherein said compressor rotor is a lower pressure compressor rotor, and said higher pressure turbine rotor driving a higher pressure compressor rotor.

20. The method as set forth in claim 15, wherein said first turbine rotor and said fan turbine rotor are provided by a single rotor.

21. The gas turbine engine as set forth in claim 1, wherein the formula does not hold true for each of the blade rows of the compressor rotor.

22. The method as set forth in claim 15, wherein the formula does not hold true for each of the blade rows of the compressor rotor.

23. A gas turbine engine comprising:
a fan and a turbine section having a fan drive turbine rotor, and a compressor rotor;
a gear reduction effecting a reduction in the speed of said fan relative to an input speed from said fan drive turbine rotor;
said compressor rotor having a number of compressor blades in at least one of a plurality of rows of said compressor rotor, and said blades operating at least some of the time at a rotational speed, and said number of compressor blades in said at least one row and said rotational speed being such that the following formula holds true for said at least one row of the compressor rotor:

5500 Hz≤(said number of blades×said rotational speed)/60 sec≤6000 Hz;

said rotational speed being an approach speed in revolutions per minute; and
wherein a pressure ratio across the fan drive turbine rotor being greater than about 5.

24. The gas turbine engine as set forth in claim 23, wherein said turbine section including a higher pressure turbine rotor and a lower pressure turbine rotor, and said fan drive turbine rotor being said lower pressure turbine rotor.

25. The gas turbine engine as set forth in claim 23, wherein the formula does not hold true for each of the blade rows of the compressor rotor.

26. The gas turbine engine as set forth in claim 25, wherein said gear reduction has a gear ratio of greater than about 2.5.

27. The gas turbine engine as set forth in claim 25, wherein said fan delivers air into a bypass duct, and a portion of air into said compressor rotor, with a bypass ratio defined as the volume of air delivered into the bypass duct compared to the volume of air delivered into the compressor rotor, and said bypass ratio being greater than about 10.

\* \* \* \* \*